(12) United States Patent
Popovici (10) Patent No.: US 8,965,875 B1
(45) Date of Patent: Feb. 24, 2015

(54) REMOVING SUBSTITUTION RULES BASED ON USER INTERACTIONS (75) Inventor: Dan Popovici, Cupertino, CA (US)

(73) Assignee: Google Inc., Moutain View, CA (US)

( * ) Notice: Subject to any disclaimer, the term of this patent is extended or adjusted under 35 U.S.C. 154(b) by 254 days.

(21) Appl. No.: 13/443,405

(22) Filed: Apr. 10, 2012

Related U.S. Application Data (63) Continuation-in-part of application No. 13/342,560, filed on Jan. 3, 2012, now Pat. No. 8,600,973.

(60) Provisional application No. 61/620,632, filed on Apr. 5, 2012.

(51) Int. Cl.
*G06F 17/30* (2006.01)
(52) U.S. Cl.
USPC .............. 707/708; 707/769; 707/766
(58) Field of Classification Search
CPC .......... G06F 17/30864; G06F 17/3064; G06F 17/30646; G06F 17/30967; G06F 17/30672
USPC .................. 707/708, 766, 767, 769
See application file for complete search history.

(56) References Cited

U.S. PATENT DOCUMENTS

| | | | |
|---|---|---|---|
| 4,164,025 A | 8/1979 | Dubnowski et al. | |
| 4,823,306 A | 4/1989 | Barbic et al. | |
| 5,724,571 A | 3/1998 | Woods | |
| 5,826,261 A | 10/1998 | Spencer | |
| 5,926,812 A | 7/1999 | Hilsenrath et al. | |
| 5,960,383 A | 9/1999 | Fleischer | |
| 5,987,457 A | 11/1999 | Ballard | |
| 6,006,222 A | 12/1999 | Culliss | |
| 6,012,053 A | 1/2000 | Pant et al. | |
| 6,014,665 A | 1/2000 | Culliss | |
| 6,029,195 A | 2/2000 | Herz | |
| 6,035,294 A | 3/2000 | Fish | |
| 6,078,916 A | 6/2000 | Culliss | |

(Continued)

FOREIGN PATENT DOCUMENTS

| | | |
|---|---|---|
| EP | 1505520 | 5/2006 |
| WO | 2006096842 | 9/2006 |

OTHER PUBLICATIONS

Notice of Allowance received in U.S. Appl. No. 13/342,560 on Jul. 24, 2013, 23 pages.

(Continued)

*Primary Examiner* — Monica Pyo
(74) *Attorney, Agent, or Firm* — Fish & Richardson P.C.

(57) ABSTRACT

Methods, systems, and apparatus, including computer programs encoded on a computer storage medium, for removing substitution rules. According to one implementation, a method includes identifying a plurality of revised search queries associated with a substitution rule, wherein the substitution rule is used to generate the revised search queries from each of a plurality of original search queries to include a substitute query term for an original query term included in the original search queries; for each of the revised search queries, accessing query log data that identifies (i) a set of search results generated by the respective revised search query, and (ii) a particular, user-selected search result in the set of search results; determining a quality metric for the substitution rule using the query log data; determining that the quality metric does not satisfy a threshold; and in response to determining that the quality metric does not satisfy the threshold, removing the substitution rule.

24 Claims, 4 Drawing Sheets

(56) References Cited

U.S. PATENT DOCUMENTS

| | | |
|---|---|---|
| 6,169,986 B1 | 1/2001 | Bowman et al. |
| 6,182,067 B1 | 1/2001 | Presnell et al. |
| 6,272,507 B1 | 8/2001 | Pirolli et al. |
| 6,285,999 B1 | 9/2001 | Page |
| 6,289,353 B1 | 9/2001 | Hazlehurst et al. |
| 6,311,214 B1 | 10/2001 | Rhoads |
| 6,314,419 B1 | 11/2001 | Faisal |
| 6,360,215 B1 | 3/2002 | Judd et al. |
| 6,405,175 B1 | 6/2002 | Ng |
| 6,421,675 B1 | 7/2002 | Ryan et al. |
| 6,473,752 B1 | 10/2002 | Fleming |
| 6,480,837 B1 | 11/2002 | Dutta |
| 6,513,036 B2 | 1/2003 | Fruensgaard et al. |
| 6,636,848 B1 | 10/2003 | Aridor et al. |
| 6,732,088 B1 | 5/2004 | Glance |
| 6,772,150 B1 | 8/2004 | Whitman et al. |
| 7,062,561 B1 | 6/2006 | Reisman |
| 7,085,820 B1 | 8/2006 | Nickerson et al. |
| 7,409,383 B1 | 8/2008 | Tong et al. |
| 7,480,652 B2 | 1/2009 | Wen et al. |
| 7,562,069 B1 | 7/2009 | Chowdhury et al. |
| 7,617,200 B2 | 11/2009 | Budzik et al. |
| 7,620,628 B2 | 11/2009 | Kapur et al. |
| 7,636,714 B1 | 12/2009 | Lamping et al. |
| 7,716,216 B1 | 5/2010 | Harik et al. |
| 7,860,870 B2 | 12/2010 | Sadagopan et al. |
| 7,925,498 B1 | 4/2011 | Baker et al. |
| 7,966,341 B2 | 6/2011 | Maghoul et al. |
| 8,001,118 B2 | 8/2011 | Dean et al. |
| 8,037,086 B1 | 10/2011 | Upstill et al. |
| 8,041,730 B1 | 10/2011 | Upstill et al. |
| 8,065,316 B1 | 11/2011 | Baker et al. |
| 8,103,669 B2 | 1/2012 | Castellani et al. |
| 8,250,066 B2 | 8/2012 | Miedema |
| 8,316,007 B2 | 11/2012 | Liao |
| 8,321,201 B1 | 11/2012 | Baker et al. |
| 8,346,757 B1 | 1/2013 | Lamping et al. |
| 8,429,184 B2 | 4/2013 | Ismalon |
| 8,463,782 B1 | 6/2013 | Upstill et al. |
| 8,498,974 B1 | 7/2013 | Kim et al. |
| 8,600,973 B1 | 12/2013 | Popovici et al. |
| 8,620,915 B1 | 12/2013 | Brukman et al. |
| 8,645,390 B1 | 2/2014 | Oztekin et al. |
| 8,762,363 B1 | 6/2014 | Koo et al. |
| 2002/0032735 A1 | 3/2002 | Burnstein et al. |
| 2002/0078045 A1 | 6/2002 | Dutta |
| 2002/0103798 A1 | 8/2002 | Abrol et al. |
| 2002/0133483 A1 | 9/2002 | Klenk et al. |
| 2002/0156816 A1 | 10/2002 | Kantrowitz et al. |
| 2003/0123443 A1 | 7/2003 | Anwar |
| 2003/0167266 A1 | 9/2003 | Saldanha et al. |
| 2005/0076003 A1 | 4/2005 | DuBose et al. |
| 2005/0125392 A1 | 6/2005 | Curtis et al. |
| 2006/0167842 A1 | 7/2006 | Watson |
| 2007/0011154 A1 | 1/2007 | Musgrove et al. |
| 2007/0214131 A1 | 9/2007 | Cucerzan et al. |
| 2008/0091670 A1 | 4/2008 | Ismalon |
| 2008/0097891 A1 | 4/2008 | Park |
| 2008/0114721 A1 | 5/2008 | Jones et al. |
| 2008/0114751 A1 | 5/2008 | Cramer et al. |
| 2008/0140643 A1 | 6/2008 | Ismalon |
| 2008/0228754 A1 | 9/2008 | Frank et al. |
| 2008/0235187 A1 | 9/2008 | Gade et al. |
| 2008/0270138 A1 | 10/2008 | Knight et al. |
| 2009/0006359 A1 | 1/2009 | Liao |
| 2009/0043749 A1 | 2/2009 | Garg et al. |
| 2009/0063431 A1 | 3/2009 | Erol et al. |
| 2009/0106221 A1 | 4/2009 | Meyerzon et al. |
| 2009/0119261 A1 | 5/2009 | Ismalon |
| 2009/0182734 A1 | 7/2009 | Wen et al. |
| 2010/0010968 A1 | 1/2010 | Redlich et al. |
| 2010/0125575 A1 | 5/2010 | Zaragoza |
| 2010/0138402 A1* | 6/2010 | Burroughs et al. ........... 707/706 |
| 2010/0257164 A1* | 10/2010 | Halverson et al. ........... 707/725 |
| 2010/0306229 A1 | 12/2010 | Timm et al. |
| 2011/0179023 A1 | 7/2011 | Dean et al. |
| 2012/0095951 A1 | 4/2012 | Ray |
| 2012/0158685 A1 | 6/2012 | White et al. |
| 2012/0158765 A1 | 6/2012 | Kumar et al. |
| 2012/0290637 A1 | 11/2012 | Perantatos et al. |
| 2012/0303651 A1 | 11/2012 | Tao |
| 2012/0317088 A1 | 12/2012 | Pantel et al. |
| 2012/0323677 A1 | 12/2012 | Bottou et al. |
| 2013/0246383 A1 | 9/2013 | White et al. |

OTHER PUBLICATIONS

Office Action issued in U.S. Appl. No. 13/342,560 on Nov. 26, 2012, 16 pages.

"The Direct Hit Popularity Engine Technology, A White Paper," [online]; Retrieved from the Internet URL: http://www.uni-koblenz.de/FB4, Institues/ICV/AGKrause/Teachings/SS07/DirectHit.pdf, Apr. 2, 2009, 5 pages.

Ananthanarayanan et al., "Rule based synonyms for entity extraction from noisy text", In Proceedings of the second workshop on Analytics for noisy unstructured text data, pp. 31-38, ACM, Jul. 2008.

Efthimiadis, "Interactive Query Expansion: A User-Based Evaluation in a Relevance Feedback Environment," Journal of the American Society for Information Science, 51(11):989-1003, 2000, John Wiley & Sons, Inc.

Office Action issued in U.S. Appl. No. 13/661,734 on Apr. 14, 2014, 6 pages.

Notice of Allowance issued in U.S. Appl. No. 13/532,326 on Feb. 25, 2014, 5 pages.

Office Action issued in U.S. Appl. No. 13/532,326 on Oct. 24, 2013, 13 pages.

Office Action issued in U.S. Appl. No. 13/481,166 on Jun. 19, 2014, 7 pages.

Office Action issued in U.S. Appl. No. 13/651,688 on Apr. 7, 2014, 32 pages.

Office Action issued in U.S. Appl. No. 13/651,688 on Jan. 17, 2014, 30 pages.

Office Action issued in U.S. Appl. No. 13/727,968 on Aug. 19, 2014, 12 pages.

Office Action issued in U.S. Appl. No. 13/302,935 on Jul. 11, 2014, 16 pages.

Notice of Allowance received in U.S. Appl. No. 13/342,560 on Jul. 24, 2013, 22 pages.

Office Action issued in U.S. Appl. No. 13/342,604 on Dec. 20, 2012, 13 pages.

Office Action issued in U.S. Appl. No. 13/342,604 on May 13, 2013, 12 pages.

Office Action issued in U.S. Appl. No. 13/564,882 on Jul. 1, 2014, 8 pages.

Huang et al., "Analyzing and Evaluating Query Reformulation Strategies in Web Search Logs," CIKM'09, Nov. 2-6, 2009, 77-86, 10 pages.

* cited by examiner

REMOVING SUBSTITUTION RULES BASED ON USER INTERACTIONS

CROSS-REFERENCE TO RELATED APPLICATION

This application is a continuation-in-part of U.S. patent application Ser. No. 13/342,560, filed on Jan. 3, 2012, and claims the benefit of U.S. Provisional Patent Application Ser. No. 61/620,632, filed on Apr. 5, 2012, both of which are incorporated by reference in their entirety.

BACKGROUND

This specification generally relates to search engines, and one particular implementation relates to evaluating substitute terms that are used in revising search queries.

SUMMARY

In general, one innovative aspect of the subject matter described in this specification can be implemented in methods that include the actions of receiving a search query, and revising the search query to include a substitute term of a query term. The search results of the revised search query are forwarded to a user, and the user interaction with the search results is evaluated to determine whether the user has selected a search result containing the substitute term. Over time, as additional user interactions associated with search results generated by revised queries including the substitute term are evaluated, the accumulated user interactions can be aggregated and evaluated to determine whether or not to continue revising search queries using the substitute term.

According to another innovative aspect of the subject matter described in this specification, a method includes identifying a plurality of revised search queries associated with a substitution rule, where the substitution rule is used to generate the revised search queries from each of a plurality of original search queries to include a substitute query term for an original query term included in the original search queries. The method also includes for each of the revised search queries, accessing query log data that identifies (i) a set of search results generated by the respective revised search query, and (ii) a particular, user-selected search result in the set of search results, determining a quality metric for the substitution rule using the query log data, determining that the quality metric does not satisfy a threshold, and in response to determining that the quality metric does not satisfy the threshold, removing the substitution rule.

Other implementations of this aspect include corresponding systems, apparatus, and computer programs, configured to perform the actions of the methods, encoded on computer storage devices.

These and other implementations can each optionally include one or more of the following features. For instance, the method includes removing the substitution rule from a query revision model; the method includes adding the substitution rule to a collection of substitution rules that identifies what substitution rules are not to be used to generate the revised search queries; the method includes identifying a context associated with the substitution rule, and identifying the plurality of revised search queries associated with the substitution rule in the identified context; the method includes accessing query log data in the identified context; the method includes modifying a general context substitution rule to a specific context substitution rule, where the specific context substitution rule revises subsequent original queries associated with the identified context to include the substitute query term, and the general context substitution rule revises subsequent original queries associated with a general context to include the substitute query term; the method includes the quality metric that is based on one or more of a click count, a skip count, a both-click count, a both-skip count, a critical-click count, or a critical-skip count; the method includes the quality metric that is determined by an equation:

$$\text{Quality Metric} = 1 - \frac{\begin{array}{l}(\text{crucial\_click\_count} * W1) + \\ (\text{click\_count} * W2) + (\text{both\_click\_count} * W3)\end{array}}{\left[\begin{array}{l}(\text{crucial\_click\_count} * W1 + (\text{click\_count} * W2) + \\ (\text{crucial\_skip\_count} * W4) + (\text{skip\_count} * W5) + \\ (\text{both\_click\_count} * W3) + (\text{both\_skip\_count} * W6)\end{array}\right]},$$

where parameters W1, W2, W3, W4, W5, and W6 are weights associated with the crucial click count, the click count, the both click count, the crucial skip count, the skip count, and the both skip count, respectively.

Advantageous implementations may include one or more of the following features. A substitute term rule which does not improve search quality can be identified empirically from search result data. The search system can evaluate the substitute term rule in various contexts independently. The search system can identify specific contexts of which the substitute term rule improves search quality and modify the general context substitute term rule accordingly.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
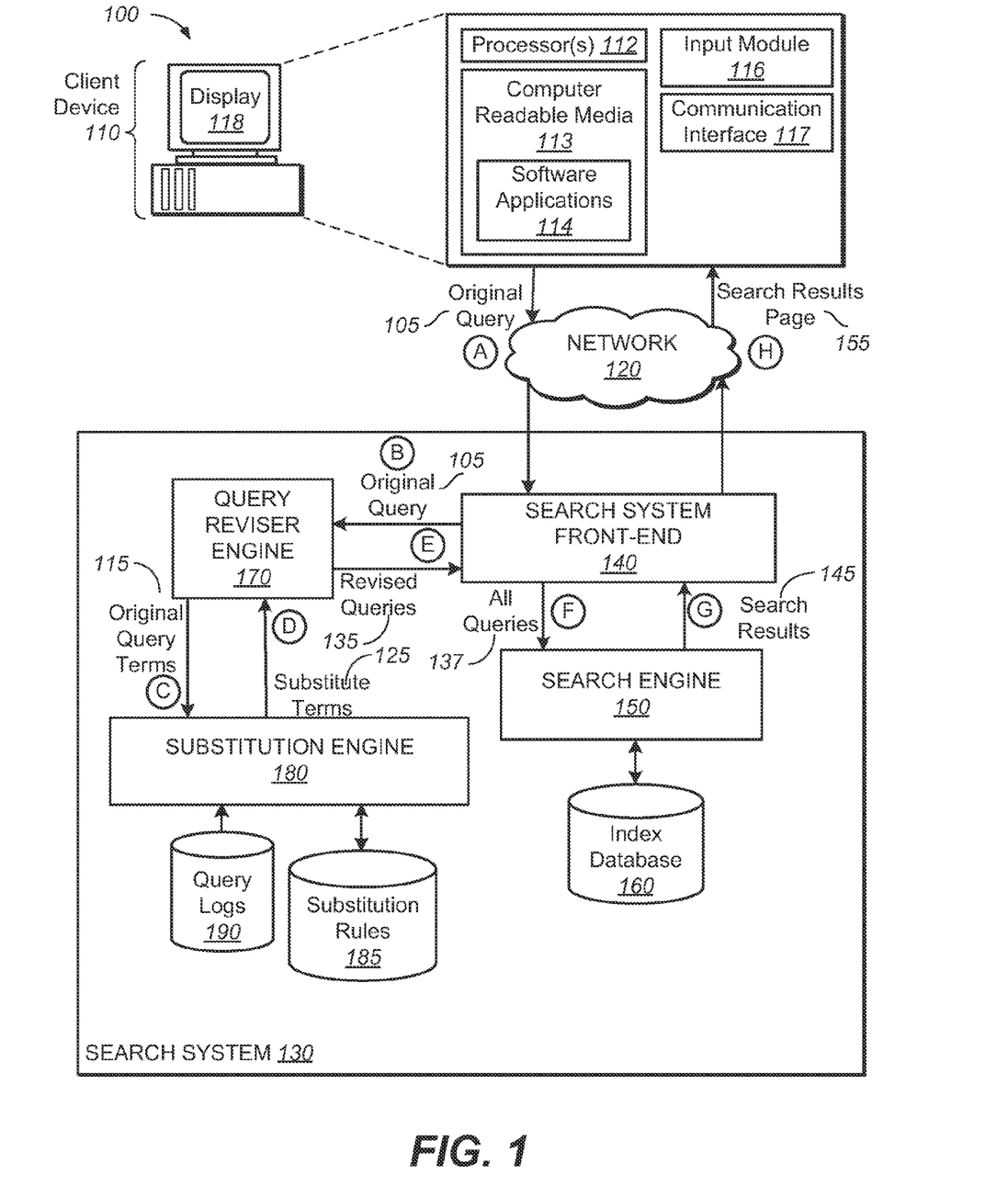
FIG. 1 is a block diagram illustrating an example system that can revise search queries using substitute terms.

FIG. 1 is a diagram of an example system 100 that can revise search queries using substitute terms. In general, the system 100 includes a client device 110 coupled to a search system 130 over a network 120. The search system 130 includes a search engine 150, a query reviser engine 170, and a substitution engine 180. The search system 130 receives a query 105, referred to by this specification as the "original query" or an "initial query," from the client device 110 over the network 120. The search system 130 provides a search results page 155, which presents search results 145 identified as being responsive to the query 105, to the client device 110 over the network 120.

In some implementations, the search results 145 identified by the search system 130 can include one or more search results that are identified as being responsive to queries that are different than the original query 105. The search system 130 can generate or obtain other queries in numerous ways (e.g., by revising the original query 105).

In some implementations, the search system 130 can generate a revised query by adding to the original query 105 additional terms that are substitute terms of one or more terms that occur in the original query 105. In other implementations, the search system 130 can generate a revised query by substituting terms that are substitute terms of terms that occur in the original query 105, in place of the terms in the original query 105. The substitution engine 180 can determine the additional terms that are candidate substitute terms for the one or more terms that occur in the original query. The query reviser engine 170 can generate the revised query. The search engine 150 can use the original query 105 and the revised queries to identify and rank search results. The search engine 150 can provide the identified search results 145 to the client device 110 on the search results page 155.

The substitution engine 180 can identify the substitute terms the query reviser engine 170 can use to generate revised queries by evaluating terms included in previously received queries stored in a query logs database 190. The queries stored in the query logs database 190 can include previous queries where a user considered the results of the queries desirable. For example, the user can "long click" the provided search results from a query, in effect, validating the search results. The queries stored in the query logs database 190 can include previous queries determined by the search system 130 as providing desirable results. For example, the search system 130 can perform a quality thresholding for returned search results from a query. The quality thresholding can include determining search results that have historically been returned for a particular query. Search results above the quality threshold can validate a query, which the search system 130 can then include in the query logs database 190.

For example, given a first term ("cat"), the substitution engine 180 can evaluate terms ("feline" or "banana") that are candidate substitute terms for the original term. In addition, the substitution engine 180 can determine that certain terms are substitute terms of the first term (as in the case of "feline"), and that other terms are not substitute terms of the first term (as in the case of "banana"). The substitution engine 180 can base this determination on rules stored in a substitution rules database 185. For example, a substitution rule can be "feline" is a substitute term for cat and "banana" is not a substitute term for cat.

The search system 130 can define substitution rules to apply generally, or to apply only when particular conditions, or "query contexts," are satisfied. For example, the query context of a substitution rule can specify one or more other terms that should be present in the query for the substitution rule to apply. Furthermore, query contexts can specify relative locations for the other terms (e.g., to the right or left of a query term under evaluation). In another example, query contexts can specify a general location (e.g., anywhere in the query). For example, a particular substitution rule can specify that the term "pet" is a substitute term for the query term "dog," but only when the query term "dog" is followed by the term "food" in the query. Multiple distinct substitution rules can generate the same substitute term for a given query term. For example, for the query term "dog" in the query "dog food," the term "pet" can be specified as a substitute term for "dog" by both a substitution rule for "dog" in the general context and a substitution rule for "dog" when followed by "food."

The substitution rules can depend on query contexts that define other terms in the original query 105. In other words, a substitution rule need not apply in all situations. For example, when the term "cats" is used as a single-term query, the term "felines" can be considered a substitute term for "cats". The substitution engine 180 can return the term "felines" to the query reviser engine 170 to generate a revised search query. In another example, when the query includes the term "cats" followed by the term "musical," a substitution rule can specify that the term "felines" is not a substitute term for "cats." In some implementations, the substitution rules can be stored in the substitution rules database 185 for use by the substitution engine 180, the query reviser engine 170, or the search engine 150.

In the illustrative example of FIG. 1, the search system 130 can be implemented as computer programs running on one or more computers in one or more locations that are coupled to each other through a network (e.g., network 120). The search system 130 includes a search system front-end 140 (e.g., a "gateway server") that coordinates requests between other parts of the search system 130 and the client device 110. The search system 130 also includes one or more "engines": the search engine 150, a query reviser engine 170, and the substitution engine 180.

As used in this specification, an "engine" (or "software engine") refers to a software implemented input/output system that provides an output that is different from the input. An engine can be an encoded block of functionality, such as a library, a platform, a Software Development Kit ("SDK"), or an object. The network 120 can include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

The search system front-end 140, the search engine 150, the query reviser engine 170, and the substitution engine 180 can be implemented on any appropriate type of computing device (e.g., servers, mobile phones, tablet computers, notebook computers, music players, e-book readers, laptop or desktop computers, PDAs, smart phones, or other stationary or portable devices) that includes one or more processors and computer readable media. Among other components, the client device 110 includes one or more processors 112, computer readable media 113 that store software applications 114 (e.g., a browser or layout engine), an input module 116 (e.g., a keyboard or mouse), a communication interface 117, and a display device 118. The computing device or devices that implement the search system front-end 140, the query reviser engine 170, and the search engine 150 may include similar or different components.

In general, the search system front-end 140 receives the original query 105 from the client device 110. The search system front-end 140 routes the original query 105 to the appropriate engines included in the search system 130 so that the search system 130 can generate the search results page 155. In some implementations, routing occurs by referencing static routing tables. In other implementations, routing occurs based on the current network load of an engine, in order to accomplish load balancing. In addition, the search system front-end 140 can provide the resulting search results page 155 to the client device 110. In doing so, the search system front-end 140 acts as a gateway, or interface, between the client device 110 and the search engine 150.

Two or more of a search system front-end, a query reviser engine and a search engine (e.g., the search system front-end 140, the query reviser engine 170, and the search engine 150, respectively) may be implemented on the same computing device, or on different computing devices. Because the search system 130 generates the search results page 155 based on the collective activity of the search system front-end 140, the query reviser engine 170, and the search engine 150, the user of the client device 110 may refer to these engines collectively as a "search engine." This specification, however, refers to the search engine 150, and not the collection of engines, as the "search engine," since the search engine 150 identifies the search results 145 in response to the user-submitted query 105.

In some implementations, the search system 130 can include many computing devices for implementing the functionality of the search system 130. The search system 130 can process the received queries and generate the search results by executing software on the computing devices in order to perform the functions of the search system 130.

Referring to FIG. 1, during state (A), a user of the client device 110 enters original query terms 115 for the original query 105, and the client device 110 communicates the original query 105 to the search system 130 over the network 120. For example, the user can submit the original query 105 by initiating a search dialogue on the client device 110, speaking or typing the original query terms 115 of the original query 105, and then pressing a search initiation button or control on the client device 110. The client device 110 formulates the original query 105 (e.g., by specifying search parameters). The client device 110 transmits the original query 105 over the network 120 to the search system 130.

Although this specification refers to the query 105 as an "original" or an "initial" query, such reference is merely intended to distinguish this query from other queries, such as the revised queries that are described below. The designation of the original query 105 as "original" is not intended to require the original query 105 to be the first query that is entered by the user, or to be a query that is manually entered. For example, the original query 105 can be the second or subsequent query entered by the user. In another example, the original query 105 can be automatically derived (e.g., by the query reviser engine 170). In another example, the original query 105 can be modified based on prior queries entered by the user, location information, and the like.

During state (B), the search system front-end 140 receives the original query 105 and communicates the original query 105 to the query reviser engine 170. The query reviser engine 170 can generate one or more revised queries 135 based on the substance of the original query 105. In some implementations, the query reviser engine 170 generates a revised query by adding terms to the original query 105 using substitute terms 125 for terms in the original query 105. In other implementations, the query reviser engine 170 generates a revised query by substituting the substitute terms 125 for the corresponding terms of the original query 105. The query reviser engine 170 can obtain substitute terms 125 for use in revising the original query 105 from the substitution engine 180.

During state (C), the query reviser engine 170 communicates original query terms 115 of the original query 105 to the substitution engine 180. The substitution engine 180 can use substitution rules included in the substitution rules database 185 to determine one or more substitute terms 125 for one or more of the original query terms 115 of the original query 105.

The substitution engine 180 communicates substitute terms 125 to the query reviser engine 170 during state (D). The query reviser engine 170 generates one or more revised queries 135 by adding substitute terms 125 to the original query 105. The query reviser engine 170 can also add logical operators (e.g. "OR") between substitute terms 125 and the corresponding original query terms. In addition, the query reviser engine 170 can generate one or more revised queries 135 by substituting certain terms of the original query 105.

In some implementations, the query reviser engine 170 can mark each of the substitute terms 125 with a confidence score in the one or more revised queries 135. The confidence score associated with a substitute term may be stored at the substitution rule database 185 or another database not shown here in the search system 130. In some implementations, the substitution engine 180 may determine the confidence score for a substitute term from previous user interactions with the substitute term in the context of the original query 105. As one example, the determination of the confidence score for a substitute term may be based partly on whether a user has selected a particular search result generated by the revised query which includes the substitute term, where the particular search result is not included in the search results generated by the original query. As another example, the confidence score for a substitute term may be based partly on whether a user has skipped a particular search result generated by a revised query which includes the substitute term, where the particular search result is not included in the search results generated by the original query, and the particular search result is ranked higher than the selected search result among the search results returned to the user. In some other implementations, the substitution engine 180 may determine the confidence score of a substitute term from the search results generated by the original query 105. As one example, the confidence score for a substitute term may be partly based on a change in relative rankings among search results generated by the original and revised queries. As another example, the confidence score for a substitute term may be partly based on the number of new search results generated by the revised query. Alternatively, the administrator of the search system 130 may manually assign the confidence score to a substitute term The query reviser engine 170 communicates the one or more revised queries 135 to the search system front-end 140 during state (E). The search system front-end 140 communicates the original query 105 along with the one or more revised queries 135 to the search engine 150 as all queries 137 during state (F). The search engine 150 generates search results 145 that it identifies as being responsive to the original query 105 and/or the one or more revised queries 135. The search engine 150 can identify search results 145 for each query using an index database 160 that stores indexed resources (e.g., web pages, images, or news articles on the Internet). The search engine 150 can combine and rank the identified search results 145 and communicate the search results 145 to the search system front-end 140 during state (G).

The search system front-end 140 generates a search results page 155 that identifies the search results 145. For example, each of the search results 145 can include, but are not limited to, titles, text snippets, images, links, reviews, or other information. The original query terms 115 or the substitute terms 125 that appear in the search results 145 can be formatted in a particular way (e.g., in bold print and/or italicized print). For example, the search system front-end 140 transmits a document that includes markup language (e.g., HyperText Markup Language or eXtensible Markup Language) for the search results page 155 to the client device 110 over the network 120 at state (H). The client device 110 reads the document (e.g., using a web browser) in order to display the search results page 155 on display device 118. The client device 110 can display the original query terms 115 of the original query 105 in a query box (or "search box"), located, for example, on the top of the search results page 155. In addition, the client device 110 can display the search results 145 in a search results box, for example, located on the left-hand side of the search results page 155.

Figure 2A:
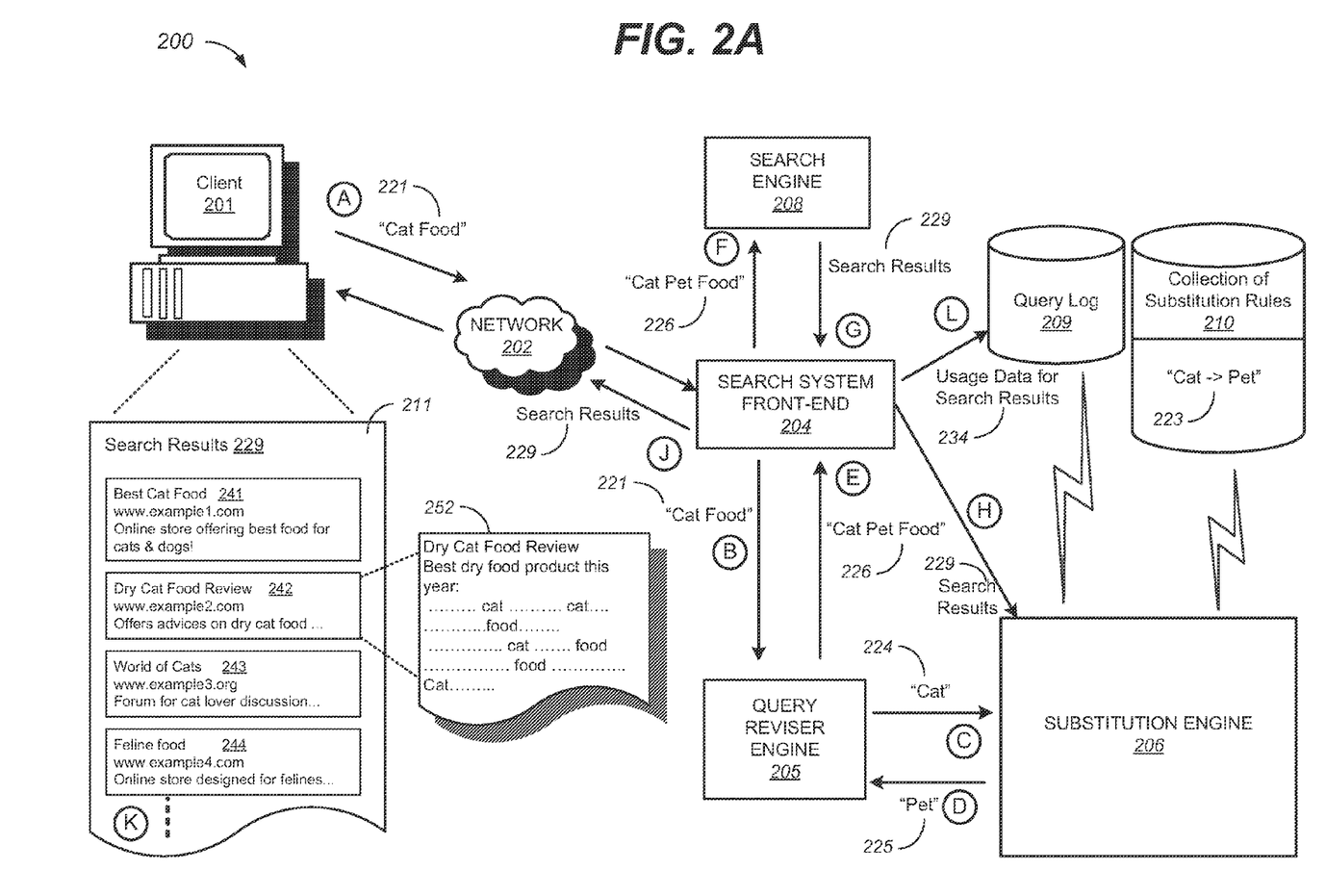
FIGS. 2A and 2B are diagrams of an example system that removes and adds a substitution rule in different contexts based on user interactions with the search results generated by the substitution rule.
Figure 2B:
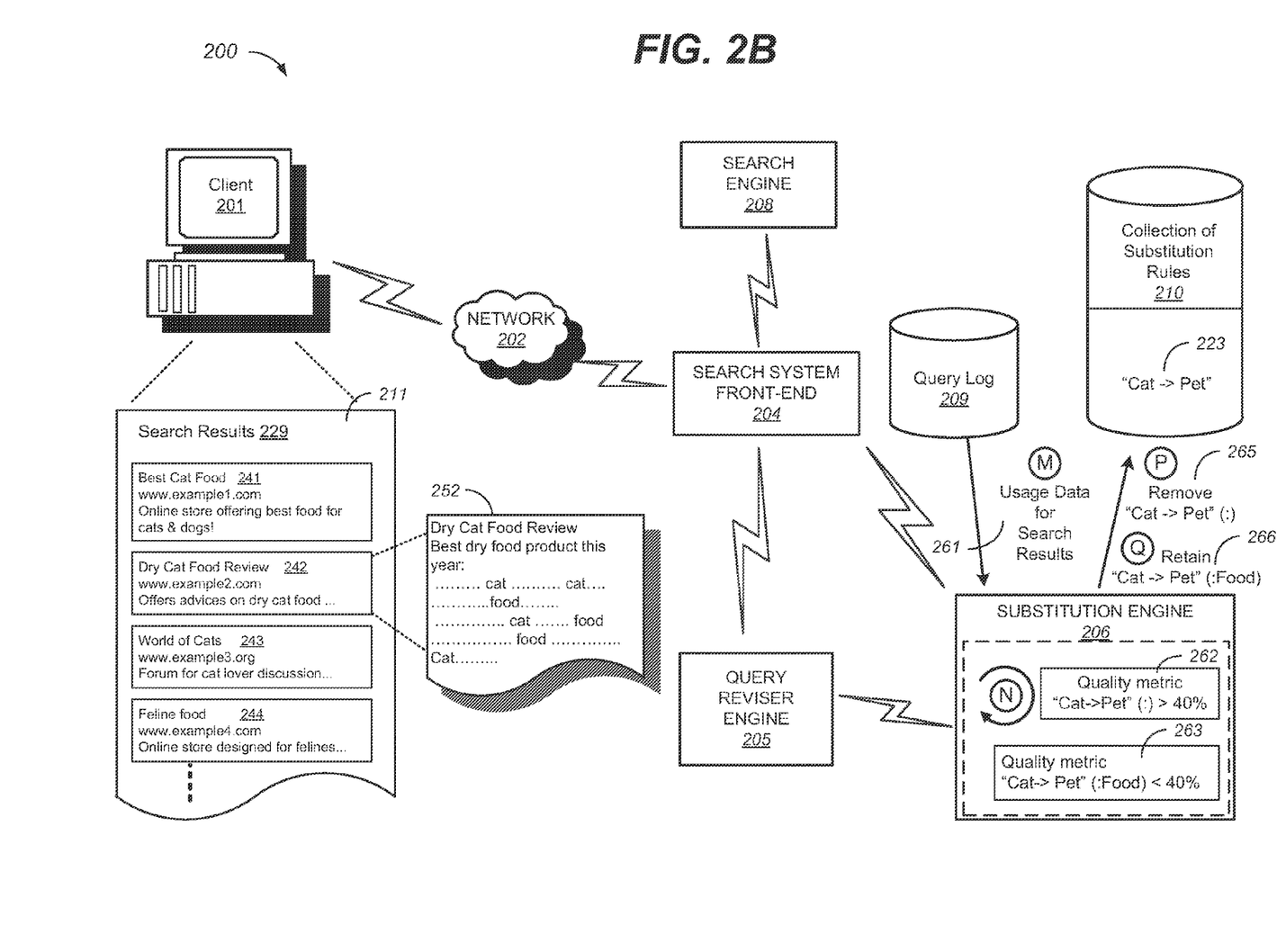

FIG. 2A and FIG. 2B are diagrams of an example system 200 that removes and adds a substitution rule in different contexts based on user interactions with the search results generated by the substitution rule. In general, when a user submits an original query to the system 200, the user may or may not know the best query terms for obtaining the most relevant search results. The system 200 may attempt to improve the search result quality in two phases.

In general, FIG. 2A describes the first phase, where the system 200 applies a substitution rule to revise the original query into a revised query. The system 200 then obtains a set of search results generated from the revised query, sends the search results to the user, and collects usage data on the search results from the user. FIG. 2B describes the second phase, where the system 200 analyzes an aggregation of search results and usage data related to the substitution rule over a specific period of time, and then determines whether to remove the substitution rule from the system 200, to continue using the substitution rule, or to remove or to add a substitution rule in a particular context. In general, the system 200 includes a client device 201, a network 202, a search system front-end 204, a query reviser engine 205, a substitution engine 206, a search engine 208, a query log 209, and a collection of substitution rules 210.

In general, the search system front-end 204 coordinates the requests and responses among the client device 201, the query reviser engine 205, the substitution engine 206, and the search engine 208. For example, when a user operating the client device 201 issues an original query, the original query can be routed to the search system front end 204 through the network 202. In some implementations, the search system front end 204 can forward the original query to the query reviser engine 205 to determine whether and how to revise the original query. Then, upon receiving a response including a revised query from the query reviser engine 205, the search system front-end 204 forwards the revised query to the search engine 208. Once the search engine 208 identifies search results, the search engine 208 sends the search results to the search system front-end 204. Then the search system front-end 204 sends the search results to the client device 201 and to the substitution engine 206.

In more detail, the query reviser engine 205 receives an original query from the search system front-end 204 as an input, and based on the substance of the original query, the query reviser engine 205 can generate a revised query by adding, substituting, or removing query terms in the original query. For example, the query reviser engine 205 can generate a revised query to include substitute terms of the original query terms. In some implementations, the query reviser engine 205 can generate a revised query using substitute terms of one or more of the original query terms. The query reviser engine 205 can obtain substitute terms for revising the original query from the substitution engine 206.

In more detail, the substitution engine 206 applies one or more substitution rules from a collection 210 of substitution rules to an input query term, and provides the query reviser engine 205 with a substitute term for the input query term. The collection 210 of substitution rules is, for example, a list or other data structure that specifies which substitute terms or substitution rules that a query reviser may use to revise search queries. In an alternative implementation, the collection 210 of substitution rules may be a list of substitute terms or substitution rules that a query reviser may not use to revise search queries. In some implementations, the substitution engine 206 can add a new substitution rule to the collection 210 upon evaluation of the new substitution rule. In some implementations, the substitution engine 206 can remove an existing substitution rule from the collection 210 upon evaluation of the existing substitution rule.

In some implementations, the search engine 208 can generate search results based on the collective activity of the search system front-end 204, the query reviser engine 205, and the substitution engine 206. For example, the search engine 208 can receive the revised query from the search system front-end 204, where the revised query may include substitute terms of the original query terms. The search engine 208 can then generate search results based on the revised query, and send the search results to the search system front-end 204.

The user query log 209 is a repository which stores usage data associated with search results. The usage data can be collected and aggregated over time based on users' interactions with search results, including the search results generated by revised queries based on substitution rules. The usage data can include information regarding the substitution rules applied to the original query terms, the search results generated by the search engine 208, and the users' interactions with the search results. In some implementations, protective steps may be taken with respect to user privacy. For example, depending on the particular type of data being used, the services being provided, and the ability to provide certain services with modified data, a system may partially or fully anonymize data in user query log 209 so as to prevent personally identifiable information from being disclosed. In some implementations, users can opt-out to decline their usage data to be collected and stored in the user query log 209.

A substitution rule in the collection 210 is a rule which has been selected for use by a query reviser engine 205 in revising search queries. The selection can be determined by an evaluation or test under certain criteria. In some implementations, the substitution engine 206 performs the evaluation. In some implementations, substitution rules are stored in the collection 210 as a data structure. The data structure may be constructed in any type of format (e.g., text, binary, etc.), as long as the collection 210 can modify the data structure within the collection 210. In some implementations, the substitution rule can either be in the general context, in which the substitution rule applies regardless of other terms in the query, or the substitution rule can be context-specific, in which the substitution rule only applies when other particular words are in the query. For example, a substitution rule "(Y->Z)" indicates that a query reviser may revise search queries that include the query term "Y" to include the query term "Z."

FIG. 2A also illustrates an example flow of data describing the first phase of a process, shown in states (A) to (L). States (A) to (L) may occur in the illustrated sequence, or they may occur in a sequence that is different than in the illustrated sequence. In some implementations, one or more of the States (A) to (L) may occur offline, where the search system may perform computations when some users are not connected to the search system. During state (A), a user operating a client device 201 makes an original query 221 "Cat Food". The original query 221 is transmitted to the network 202, where the network 202 then routes the original query 221 to the search system front-end 204.

During state (B), the search system front-end 204 receives the original query 221, and forwards the original query 221 to the query reviser engine 205. The query reviser engine 205 analyzes the original query 221, and identifies that adding a substitute term to the original query term "Cat" in the original query 221 may improve the quality of the search results.

During state (C), the query reviser engine 205 sends the original query term 224 "Cat" to the substitution engine 206. In some implementation, the query reviser engine 205 may include a context for the original query term 224 (i.e. "Cat" in the context of "Food"). In this present example, only the original query term 224 "Cat" is sent to the substitution engine 206, indicating that the query reviser engine 205 is requesting a substitute term for the original query term 224 in the general context. In some implementations, the substitution engine 206 can identify one or more substitute terms for the original query term 224 by applying substitution rules from the collection 210 of substitution rules. Here, the collection 210 includes a substitution rule 223 "Cat->Pet," and based on the substitution rule 223, the substitution engine 206 determines a revised query term 225 "Pet" as the substitute term for the original query term 224 "Cat" in the general context.

During state (D), the substitution engine 206 sends the revised query term 225 "Pet" to the query reviser engine 205. In one implementation, the query reviser engine 205 may then substitute the original query term "Cat" with the revised query term "Pet." In another implementation, the query reviser engine 205 may include the revised query term 225 in the original query 221. Here, the query reviser engine 205 modifies the original query 221 to include the substitute term, and generates a revised query 226 "Cat Pet Food."

During state (E), the query reviser engine 205 sends the revised query 226 to the search system front-end 204. During state (F), the search system front-end 204 sends the revised query 226 to the search engine 208. The search engine 208 analyzes the revised query 226, and generates a set of search results 229. In some implementations, the search results 229 may include information regarding the titles, addresses, snippets, and links to the resources referenced by the search results. The resources can be in the form of word documents, pictures, videos, webpages, etc. Each of the resources referenced by the search results may or may not contain the substitute term (i.e. "Pet") included in the revised query 226.

During state (G), the search engine 208 sends the search results 229 to the search system front-end 204. In one implementation, the search engine 208 can generate the search results 229 into a data format which can be interpreted by and displayed on a browser software in the client device 201. In another implementation, the search engine 208 can send the search results 229 to the search system front-end 204 in a proprietary format (i.e. binary, text separated by delimiters, etc.) interpretable only by the search system, and the search system front-end 204 can then parse the search results and generate the search results 229 into a data format which can be interpreted and displayed by a browser program in the client device 201. In some implementations, the search engine 208 determines a quality score for each of the search results 229, where the quality score is associated with the resource referenced by the corresponding search result. The quality scores may or may not be dependent on the revised query 226 received at the search engine 208. In some implementations, the search results are then ranked according to their relative quality scores.

During state (H), the search system front-end 204 sends the search results 229 to the substitution engine 206. In some implementations, the search system front-end 204 can send the search results 229 directly to the substitution engine 206. In some implementations, the search system front-end 204 can store the search results 229 at an external storage system, and send the substitution engine the location of the search results 229. The substitution engine 206 can then access and store the search results 229 and associates the search results 229 with the substitution rule 223. As more users continue to make original queries which are revised according to the substitution rule 223 by the query reviser engine 205 and the substitution engine 206 over time, more search results associated with the substitution rule 223 can continue to accumulate.

During state (J), the search system front-end 204 sends the search results 229 to the client device 201 through the network 202. The browser software on the client device 201 interprets and displays the search results 229 to the user.

During state (K), the user interacts with the search results 229 on the display 211. In this present example, several search results are displayed to the user, including the top four, highest ranking search results 241 to 244. Within each search result, information including a title, a website address, and a snippet of the resource are presented to the user. When the user selects the search result 242, a resource 252 referenced by the search result 242 is retrieved through the network 202 and presented to the user. Here, the content of the resource 252 includes several instances of the original query terms "cat" and "food," but does not include the substitute term "Pet" as suggested by the substitution rule 223. In some implementations, the user's interaction with the search results 232 is then recorded and forwarded to the search system front-end 204 through the network 202.

During state (L), the search system front-end 204 forwards the user's interaction with the search results 229 to the query log 209, and the interaction is stored as usage data 234 in the query log 209. In some implementations, the usage data 234 may include the user response to the search results 229 (i.e. click on search result 234), the search results 229, the original query 221, and the revised query 226 generated by the substitution rule 223. The usage data associated with the substitution rule 223 can accumulate in the query log 209 over time, as more users continue to respond to search results generated from revised queries associated with the substitution rule 223.

FIG. 2B also illustrates an example flow of data describing the second phase of the process, shown in states (M) to (Q). States (M) to (Q) may occur before or after states (A) to (L) of FIG. 2A, may occur in the illustrated sequence, or they may occur in a sequence that is different than in the illustrated sequence. In some implementations, one or more of the States (M) to (Q) may occur offline, where the search system may perform computations when some users are not connected to the search system. As one example, the substitution engine 206 may request an aggregation of usage data associated with a substitution rule over time offline. As another example, the substitution engine 206 may modify a substitution rule in the collection 210 of substitution rules offline.

During state (M), the substitution engine 206 receives aggregated usage data 261 for search results associated with the substitution rule 223. In some implementations, the substitution engine 206 can directly request the aggregated usage data 261 from the query log 209. In some implementations, the query log 209 can send the aggregated usage data 261 to the substitution engine 206 periodically. In some implementations, the query log 209 can send the aggregated usage data 261 to the substitution engine 206 when the aggregated usage data 261 meets a criterion (i.e. reaching a pre-determined number of user responses).

During state (N), the substitution engine 206 evaluates the substitution rule 223 to determine a quality metric associated with the substitution rule 223. In some implementations, the substitution engine 206 evaluates the search results generated from all revised queries associated with the substitution rule 223 during a predetermined period of time. For each revised query, the substitution engine 206 can analyze the user interaction with the search results associated with the revised query. In some other implementations, the substitution engine 206 can analyze the resources referenced by the search results associated with the revised query. In some implementations, the substitution engine 206 can analyze the aggregated usage data 261 associated with the substitution rule 223, by selecting only those instances of the aggregated usage data 261 where one or more of the top n resources do contain the substitute term, where n is an adjustable parameter number determined either manually or automatically by the substitution engine 206.

To evaluate a substitution rule based on user interaction with provided search results, various metrics can be computed and combined into a score for the substitution rule. A separate score can be computed for each substitution rule, in a general context or in a specific context.

One metric that can be used to evaluate synonym rules is "clicks." In some implementations, a "click" occurs when a user selects a search result that was identified for a revised search query when the referenced document of the selected search result: (i) includes a substitute term of an original query term that occurs in the revised search query and (ii) does not include the original query term. In other implementations, a "click" occurs when the search result itself, and not the referenced document, satisfies these criteria. Although the selection of a search result is referred to by this specification as a "click," the selection can also be a voice-based selection, or a selection by a user's finger on a presence-sensitive input mechanism, e.g., a touch-screen device, or any other appropriate selection mechanism.

When a referenced document of a selected search result contains both a substitute term of an original query term as well as the original query term, it may be unclear whether the original query term or the substitute term was responsible for selection of the search result. In these cases, the selection of the search result can be treated as a special case referred to as a "both click." In some implementations, "both clicks" are given a weight smaller than clicks due to the potential ambiguity of the user selection.

Another metric that can be used to evaluate synonym rules is "skips." A skip occurs when a user skips over a particular search result that was identified for a revised search query when the referenced resource of the skipped search result: (i) includes a substitute term of an original query term that occurs in the revised search query, and (ii) does not include the original query term. Skipping over the particular search result occurs when the user selects another search result that is ranked lower than, or displayed beneath, the particular result on a search results page. In other implementations, a "skip" occurs when the search result itself, and not the referenced document, satisfies these criteria.

In cases where a skipped search result contains both a substitute term of an original query term as well as the original query term, the skip can be treated as a special case referred to as a "both skip." In some implementations, "both skips" are given a weight smaller than skips due to the ambiguity of the user skip.

Some types of clicks and skips are particularly informative for use in evaluating substitution rules. These situations will be referred to in this specification as "crucial clicks" and "crucial skips." A crucial click or crucial skip situation occurs when a search result that is clicked or skipped is more directly associated with a single, particular substitution term.

In general, a crucial click occurs when a user selects a search result that was identified for a revised search query when the referenced document of the selected search result: (i) includes a substitution term of an original query term that occurs in the revised search query, (ii) does not include the original query term, and (iii) does not include any other substitution term of the original query term that occurs in the revised search query. In other implementations, a "crucial click" occurs when the search result itself, and not the referenced document, satisfies these criteria.

In general, a crucial skip occurs when a user selects of a search result that was below a search result that was identified for a revised search query when the referenced document of the skipped search result: (i) includes a substitution term of an original query term that occurs in the revised search query, (ii) does not include the original query term, and (iii) does not include any other substitution term of the original query term that occurs in the revised search query. In other implementations, a "crucial click" occurs when the search result itself, and not the referenced document, satisfies these criteria.

The substitution engine 206 can aggregate counts of clicks, skips, both clicks, both skips, crucial clicks, and crucial skips into a single score to evaluate a particular substitution rule. In some implementations, the substitution engine 206 can remove a substitution rule whose corresponding score does not satisfy a threshold.

For example, the substitution engine 206 can assign a respective weight (e.g. 0, 1, 3, 5, 10, 25, etc.) to a crucial click count, a crucial skip count, a click count, a skip count, a both click count, and a both skip count. In some implementations, the weights are empirically determined by the substitution engine 206. The substitution engine 206 can then compute a weighted quality metric ratio using a combination of counts recorded for a particular synonym rule as shown below in Equation (1), using example weights 5, 1, and 0 for crucial click/crucial skip, click/skip, and both click/both skip, respectively:

$$\text{Quality Metric} = 1 - \frac{(\text{crucial\_click\_count} * 5) + (\text{click\_count} * 1) + (\text{both\_click\_count} * 0)}{\begin{bmatrix} (\text{crucial\_click\_count} * 5) + (\text{click\_count} * 1) + \\ (\text{crucial\_skip\_count} * 5) + (\text{skip\_count} * 1) + \\ (\text{both\_click\_count} * 0) + (\text{both\_skip\_count} * 0) \end{bmatrix}}, \quad (1)$$

In some implementations, a quality metric reflects a ratio where the user interactions did not select search results containing the substitute term. If the quality metric associated with a particular substitution rule does not satisfy a threshold (e.g. the quality metric greater than 40%), the substitution engine 206 can remove or demote the particular substitution rule. The threshold can be manually determined by the administrator of the substitution engine 206, or can be automatically determined by the substitution engine 206 upon receiving the aggregated usage data 261 associated with the substitution rule 223. After removing the substitution rule from the system, revised queries generated by the substitution engine 206 will not include the substitution term identified with the particular synonym rule.

In general, the substitution engine 206 may analyze the aggregated usage data associated with a substitution rule in the general context and in one or more specific contexts. In some implementations, the general context substitution rule and each of the specific context substitution rules may be individually stored in the collection 210 of substitution rules, where the substitution engine 206 analyzes each of the general and specific context substitution rules independently. In this present example, the substitution engine 206 analyzes the aggregated usage data associated with the substitution rule 223 in the general context and in the specific context of "Food." In some implementations, the aggregated usage data associated with the general context may also include the aggregated usage data associated with the specific context. For each of the revised query associated with the substitution rule 223 in the context under analysis, the substitution engine 206 can retrieve the resources (i.e. resource 252) referenced by the search results (i.e. 241 to 244). In some implementations, the substitution engine 206 can determine which search result has been selected by the user (i.e. 242), and based on the selection, the substitution engine 206 can determine whether the selection constitutes a crucial click, a crucial skip, a click, a skip, a both click, or a both skip.

In this present example, the quality metric threshold is 40%, where a substitution rule having a quality metric higher than 40% may not improve search quality and is to be removed from the collection 210 of substitution rules. If a substitution rule has a quality metric lower than 40%, the substitution rule may improve search quality and is to be retained or added to the collection 210 of substitution rules. Here, the substitute engine 206 determines that the quality metric 262 of the substitution rule 223 in the general context exceeds 40%, while the quality metric 263 of the substitution rule 223 in the specific context of "Food" does not exceed 40%. In some implementations, the substitution engine 206 can retain a substitution rule in a specific context if the substitution rule is already in the collection 210 of substitution rules. In some implementations, the substitution engine 206 can add a substitution rule in a specific context if the substitution rule is not currently in the collection 210 of substitution rules.

During state (P), the substitution engine 206 has determined that the substitution rule 223 does not improve search quality in the general context, and issues an indication 265 to remove the substitution rule 223 in the general context from the collection 210 of substitution rules. In one implementation, the substitution rule 223 in the general context may be removed from the list or other data structure in the collection 210 that specifies which substitution rules that the query reviser engine 205 may use to revise search queries. In another implementation, the substitute term 223 in the general context may be added to a list of substitution rules in the collection 210 that the query reviser engine 205 may not use to revise search queries.

During state (Q), the substitution engine 206 has determined that the substitution rule 223 improves search quality in the specific context of "Food", and issues an indication 266 to store the substitution rule "Cat->Pet" in the context of "Food" in the collection 210. If the substitution rule in the specific context is not currently stored in the collection 210, the specific context substitution rule may be added to the list or other data structure that specifies which substitution rules that the query reviser engine 205 may use to revise search queries. In an alternative implementation, the substitution engine 206 may modify the context associated with the substitution rule 223 from general to the specific context during state (P) of the operation.

Subsequently, when a user makes a query containing the original query term "Cat" to the system 200, the substitution engine 206 determines the substitution rules associated with the original query term and decides not to indicate to the query reviser engine 205 to revise the original query to include the substitution term "Pet" unless the original query is in the specific context of "Food" (e.g. "cat food distributor in New York"). In one implementation, the substitution engine 206 may make the decision to include the substitution term by determining that the collection 210 of substitution rules contains the specific-context substitution rule "Cat>Pet (:Food)" but not the general-context substitution rule. In another implementation, the substitution engine 206 may make the decision by determining that the general-context substitution rule is stored in a list of substitution rules in the collection 210 which specifies that the query reviser engine 205 may not use to revise search queries, regardless whether or not the general-context substitution rule is also stored in another list in the collection 210 that specifies which substitution rules that the query reviser engine 205 may use to revise search queries.

Figure 3:
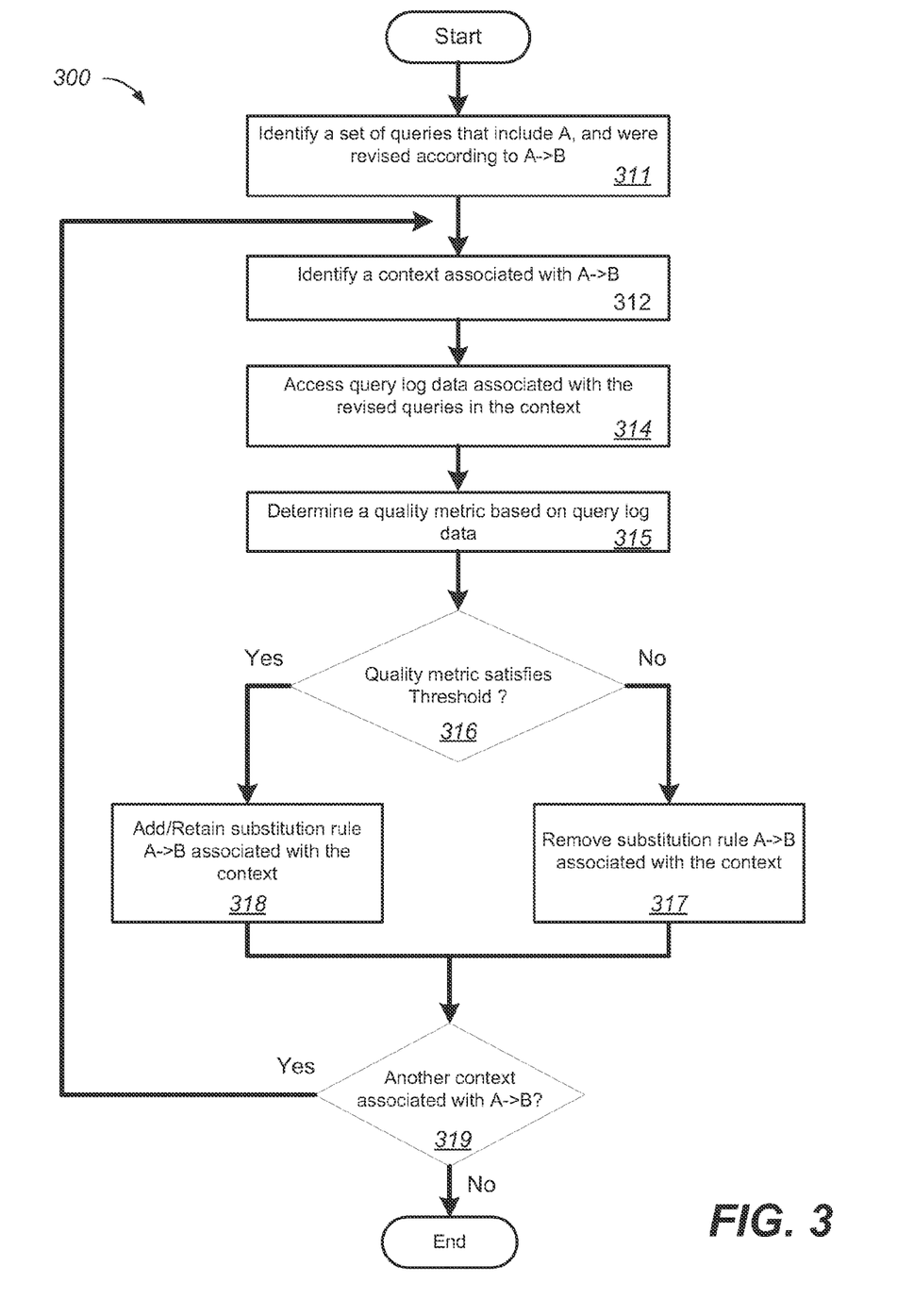
FIG. 3 is a flow chart illustrating an example process for adding a substitution rule in a specific context and removing a substitution rule in the general context based on user interactions with the search results generated by the substitution rule.

FIG. 3 shows a flow chart 300 illustrating an example process for adding a substitution rule in a specific context and removing a substitution rule in the general context based on user interactions with the search results generated by the substitution rule. In general, the process 300 analyzes search results and usage data associated with a substitution rule in a context, adds or retains the substitution rule in the context which improves search quality, and removes the substitution rule in the context which does not improve search quality. The process 300 will be described as being performed by a computer system comprising one or more computers, for example, the substitution engine 206 as shown in FIGS. 2A and 2B.

The system identifies a set of revised search queries, where the revised search queries were revised to include a substitute term "B" of an original query term "A", according to the substitution rule "A->B" (311). The system then identifies a context associated with the substitution rule "A>B" (312). The context may be general or specific. In some implementations, the system may identify a context by identifying the existing substitution rules in the collection of substitution rules. In some other implementations, the system may identify a context by analyzing the accumulated query log data stored in the query log.

The system then accesses query log data associated with each of the revised query in the identified context (314). In some implementations, the aggregated query log data associated with the revised search queries include substitution rule applied to the original query, the search results generated by the revised queries, and the users' interactions to the search results. In some implementations, the revised query may contain metadata or embedded tags that allow the system to identify the substitution rule. In general, the revised search queries can originate from various components in a search system. For example, the query log data is a repository which stores the revised search queries and the usage data. The revised search queries and the usage data associated with the substitution rule can be collected and aggregated over a specified period of time.

The system determines a score for the substitution rule in the identified context using the query log data (315). In some implementations, the system evaluates the substitution rule to determine a Quality metric associated with the substitution rule. In some implementations, the system evaluates the search results generated from all revised queries associated with the substitution rule during a predetermined period of time. For each revised query, the system can analyze the user interaction with the search results associated with the revised query. In some other implementations, the system can analyze the resources referenced by the search results associated with the revised query. In some implementations, the system can analyze the aggregated usage data associated with the substitution rule, by selecting only those instances of the aggregated usage data where one or more of the top n resources do contain the substitute term.

To evaluate a substitution rule based on user interaction with provided search results, various metrics including clicks, skips, double clicks, double skips, crucial clicks, and crucial skips can be computed and combined into a score for the substitution rule. A separate score can be computed for each substitution rule, in a general context or in a specific context.

In some implementations, the system can aggregate counts of clicks, skips, both clicks, both skips, crucial clicks, and crucial skips into a single score to evaluate a particular substitution rule. In some implementations, the system can assign a respective weight (e.g. 0, 1, 3, 5, 10, 25, etc.) to a crucial click count, a crucial skip count, a click count, a skip count, a both click count, and a both skip count. In some implementations, the weights are empirically determined by the system. As one example, the system can compute a weighted "Quality metric" ratio using a combination of counts recorded for a particular synonym rule as shown below in Equation (1), using example weights 5, 1, and 0 for crucial click/crucial skip, click/skip, and both click/both skip, respectively:

$$\text{Quality Metric} = 1 - \frac{(\text{crucial\_click\_count} * 5) + (\text{click\_count} * 1) + (\text{both\_click\_count} * 0)}{\begin{bmatrix}(\text{crucial\_click\_count} * 5) + (\text{click\_count} * 1) + \\ (\text{crucial\_skip\_count} * 5) + (\text{skip\_count} * 1) + \\ (\text{both\_click\_count} * 0) + (\text{both\_skip\_count} * 0)\end{bmatrix}} \quad (1)$$

In some implementations, a Quality metric reflects a ratio where the user interactions did not select search results containing the substitute term. If the Quality metric associated with a particular substitution rule does not satisfy a threshold (e.g. the Quality metric greater than 40%), the system can remove or demote the particular substitution rule. The threshold can be manually determined by the administrator of the system, or can be automatically determined by the system upon identifying the aggregated search results and usage data associated with the substitution rule. After removing the substitution rule from the system, revised queries generated by the system will not include the substitution term identified with the particular synonym rule.

The system then determines whether the score associated with the substitution rule in the identified context satisfies the threshold (316). If the system determines that the score associated with the substitution rule in the identified context satisfies the threshold, the system can issue an indication to the collection of substitution rule to add or retain the substitution rule in the identified context (318). If the substitution rule in the identified context is not currently stored in the collection, the system may add the substitution rule in the identified context to the collection. In an alternative implementation, the system may modify the context associated with the substitution rule from an existing context to the identified context.

If the system determines that the score associated with the substitution rule in the identified context does not satisfy the threshold, the system can issue an indication to the collection of substitution rule to remove the substitution rule in the identified context (317). In one implementation, the system may remove the substitution rule in the identified context from the list or other data structure in the collection that specifies which substitution rules the system may use to revise search queries. In another implementation, the system may add the substitution rule in the identified context to a list of substitution rules in the collection that specifies which substitution rules the system may not use to revise search queries.

The system then determines whether there is another context associated with the substitution rule A->B (319), and if so, continues to determine the quality metric of another context associated with the substitution rule A->B. In some implementations, the system may identify another context by identifying the existing substitution rules in the collection of substitution rules. In some other implementations, the system may identify another context by analyzing the accumulated query log data stored in the query log.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
identifying a plurality of revised search queries associated with a substitution rule, wherein the substitution rule is used to generate the revised search queries from a plurality of original search queries such that each of the revised search queries includes a substitute query term for an original query term that is included in each of the original search queries;
for each of the revised search queries associated with the substitution rule, accessing query log data that identifies (i) a set of search results that was presented to a user in response to the respective revised search query and that includes one or more search results that were not selected by the user, and (ii) a particular, user-selected search result that was selected by the user from among the set of search results;
determining a quality metric for the substitution rule based at least on the query log data that identifies, for each of the revised search queries associated with the substitution rule, (i) the set of search results that was presented to the user in response to the respective revised search query and that includes one or more search results that were not selected by the user, and (ii) the particular, user-selected search result that was selected by the user from among the set of search results;
determining that the quality metric does not satisfy a threshold; and
in response to determining that the quality metric does not satisfy the threshold, removing the substitution rule.

2. The method of claim 1, wherein removing the substitution rule comprises removing the substitution rule from a collection of substitution rules designated to be used to generate revised search queries, such that the removed substitution rule is not used to generate revised search queries.

3. The method of claim 1, wherein removing the substitution rule comprises adding the substitution rule to a collection of substitution rules that are designated to not be used to generate revised search queries, such that the added substitution rule is not used to generate revised search queries.

4. The method of claim 1, wherein identifying the plurality of revised search queries associated with the substitution rule further comprises:
identifying a context associated with the substitution rule, wherein the context associated with the substitution rule specifies one or more query terms other than the original query term that should be present in an original search query for the substitution rule to be used to revise the original search query.

5. The method of claim 4, wherein accessing query log data comprises accessing query log data for original search queries that include the original query term in the identified context.

6. The method of claim 5, wherein removing the substitution rule comprises:
removing the substitution rule from a collection of substitution rules in the identified context that are used to revise search queries, wherein the collection of substitution rules in the identified context are used to generate revised search queries from subsequent original search queries associated with the identified context.

7. The method of claim 1, wherein the quality metric is based on a click count, a skip count, a both click count, a both skip count, a critical click count, and a critical click count, and wherein the quality metric is determined by an equation:

$$\text{Quality Metric} = 1 - \frac{(\text{crucial\_click\_count} * W1) + (\text{click\_count} * W2) + (\text{both\_click\_count} * W3)}{\begin{bmatrix} (\text{crucial\_click\_count} * W1 + (\text{click\_count} * W2) + \\ (\text{crucial\_skip\_count} * W4) + (\text{skip\_count} * W5) + \\ (\text{both\_click\_count} * W3) + (\text{both\_skip\_count} * W6) \end{bmatrix}},$$

wherein the parameters W1, W2, W3, W4, W5, and W6 are weights associated with the crucial click count, the click count, the both click count, the crucial skip count, the skip count, and the both skip count, respectively.

8. The method of claim 1, comprising determining, based on the query log data, a measure of non-selected search results that each (i) include the substitute query term for the original query term, (ii) do not include the original query term, and (iii) were ranked above the particular, user-selected search result in the set of search results that includes the non-selected search result;
wherein determining the quality metric for the substitution rule comprises determining the quality metric for the substitution rule based at least on the measure of non-selected search results.

9. The method of claim 1, comprising determining, based on the query log data, a measure of selected search results that each include (i) the substitute term for the original query term, and (ii) the original query term;
wherein determining the quality metric for the substitution rule comprises determining the quality metric for the substitution rule based at least on the measure of selected search results.

10. The method of claim 1, comprising determining, based on the query log data, a measure of selected search results that each (i) include the substitute query term for the original query term, (ii) do not include the original query term, and (iii) do not include any other substitute term for the original query term;
wherein determining the quality metric for the substitution rule comprises determining the quality metric for the substitution rule based at least on the measure of selected search results.

11. A non-transitory computer-readable medium storing software having stored thereon instructions, which, when executed by one or more computers, cause the one or more computers to perform operations of:
identifying a plurality of revised search queries associated with a substitution rule, wherein the substitution rule is used to generate the revised search queries from a plurality of original search queries such that each of the revised search queries includes a substitute query term for an original query term that is included in each of the original search queries;
for each of the revised search queries associated with the substitution rule, accessing query log data that identifies (i) a set of search results that was presented to a user in response to the respective revised search query and that includes one or more search results that were not selected by the user, and (ii) a particular, user-selected search result that was selected by the user from among the set of search results;
determining a quality metric for the substitution rule based at least on the query log data that identifies, for each of the revised search queries associated with the substitution rule, (i) the set of search results that was presented to the user in response to the respective revised search query and that includes one or more search results that were not selected by the user, and (ii) the particular, user-selected search result that was selected by the user from among the set of search results;

determining that the quality metric does not satisfy a threshold; and in response to determining that the quality metric does not satisfy the threshold, removing the substitution rule.

12. The non-transitory computer-readable medium of claim 11, wherein removing the substitution rule comprises removing the substitution rule from a collection of substitution rules designated to be used to generate revised search queries, such that the removed substitution rule is not used to generate revised search queries.

13. The non-transitory computer-readable medium of claim 11, wherein removing the substitution rule comprises adding the substitution rule to a collection of substitution rules that are designated to not be used to generate revised search queries, such that the added substitution rule is not used to generate revised search queries.

14. The non-transitory computer-readable medium of claim 11, wherein identifying the plurality of revised search queries associated with the substitution rule comprises:

identifying a context associated with the substitution rule, wherein the context associated with the substitution rule specifies one or more query terms other than the original query term that should be present in an original search query for the substitution rule to be used to revise the original search query.

15. The non-transitory computer-readable medium of claim 14, wherein accessing query log data comprises accessing query log data for original search queries that include the original query term in the identified context.

16. The non-transitory computer-readable medium of claim 15, wherein removing the substitution rule comprises:

removing the substitution rule from a collection of substitution rules in the identified context that are used to revise search queries, wherein the collection of substitution rules in the identified context are used to generate revised search queries from subsequent original search queries associated with the identified context.

17. The non-transitory computer-readable medium of claim 11, wherein the quality metric is based on a click count, a skip count, a both click count, a both skip count, a critical click count, and a critical click count, and wherein the quality metric is determined by an equation:

$$\text{Quality Metric} = 1 - \frac{(\text{crucial\_click\_count} * W1) + (\text{click\_count} * W2) + (\text{both\_click\_count} * W3)}{\left[\begin{array}{c}(\text{crucial\_click\_count} * W1 + (\text{click\_count} * W2) + \\ (\text{crucial\_skip\_count} * W4) + (\text{skip\_count} * W5) + \\ (\text{both\_click\_count} * W3) + (\text{both\_skip\_count} * W6)\end{array}\right]},$$

wherein the parameters W1, W2, W3, W4, W5, and W6 are weights associated with the crucial click count, the click count, the both click count, the crucial skip count, the skip count, and the both skip count, respectively.

18. A system comprising:

one or more computers and one or more storage devices storing instructions that are operable, when executed by the one or more computers, to cause the one or more computers to perform operations comprising:

identifying a plurality of revised search queries associated with a substitution rule, wherein the substitution rule is used to generate the revised search queries from a plurality of original search queries such that each of the revised search queries includes a substitute query term for an original query term that is included in each of the original search queries;

for each of the revised search queries associated with the substitution rule, accessing query log data that identifies (i) a set of search results that was presented to a user in response to the respective revised search query and that includes one or more search results that were not selected by the user, and (ii) a particular, user-selected search result that was selected by the user from among the set of search results;

determining a quality metric for the substitution rule based at least on the query log data that identifies, for each of the revised search queries associated with the substitution rule, (i) the set of search results that was presented to the user in response to the respective revised search query and that includes one or more search results that were not selected by the user, and (ii) the particular, user-selected search result that was selected by the user from among the set of search results;

determining that the quality metric does not satisfy a threshold; and in response to determining that the quality metric does not satisfy the threshold, removing the substitution rule.

19. The system of claim 18, wherein removing the substitution rule comprises removing the substitution rule from a collection of substitution rules designated to be used to generate revised search queries, such that the removed substitution rule is not used to generate revised search queries.

20. The system of claim 18, wherein removing the substitution rule comprises adding the substitution rule to a collection of substitution rules that are designated to not be used to generate revised search queries, such that the added substitution rule is not used to generate revised search queries.

21. The system of claim 18, wherein identifying the plurality of revised search queries associated with the substitution rule comprises:

identifying a context associated with the substitution rule, wherein the context associated with the substitution rule specifies one or more query terms other than the original query term that should be present in an original search query for the substitution rule to be used to revise the original search query.

22. The system of claim 21, wherein accessing query log data comprises accessing query log data for original search queries that include the original query term in the identified context.

23. The system of claim 22, wherein removing the substitution rule comprises:

removing the substitution rule from a collection of substitution rules in the identified context that are used to revise search queries, wherein the collection of substitution rules in the identified context are used to generate revised search queries from subsequent original search queries associated with the identified context.

24. The system of claim 18, wherein the quality metric is based on a click count, a skip count, a both click count, a both skip count, a critical click count, and a critical click count, and wherein the quality metric is determined by an equation:

$$\text{Quality Metric} = 1 - \frac{\begin{array}{c}(\text{crucial\_click\_count} * W1) + \\ (\text{click\_count} * W2) + (\text{both\_click\_count} * W3)\end{array}}{\left[\begin{array}{c}(\text{crucial\_click\_count} * W1 + (\text{click\_count} * W2) + \\ (\text{crucial\_skip\_count} * W4) + (\text{skip\_count} * W5) + \\ (\text{both\_click\_count} * W3) + (\text{both\_skip\_count} * W6)\end{array}\right]},$$

wherein the parameters W1, W2, W3, W4, W5, and W6 are weights associated with the crucial click count, the click count, the both click count, the crucial skip count, the skip count, and the both skip count, respectively.

\* \* \* \* \*

UNITED STATES PATENT AND TRADEMARK OFFICE
CERTIFICATE OF CORRECTION

| | | |
|---|---|---|
| PATENT NO. | : 8,965,875 B1 | Page 1 of 1 |
| APPLICATION NO. | : 13/443405 | |
| DATED | : February 24, 2015 | |
| INVENTOR(S) | : Dan Popovici | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 349 days.

Signed and Sealed this
Fifth Day of January, 2016

Michelle K. Lee
*Director of the United States Patent and Trademark Office*